US005693718A

United States Patent [19]

De Groot et al.

[11] Patent Number: 5,693,718
[45] Date of Patent: Dec. 2, 1997

[54] BLOCK COPOLYMERS HAVING IMPROVED COMBINATIONS OF PROPERTIES

[75] Inventors: Hendrik De Groot; Karel Hendrik Leffelaar; Jacqueline Margaretha Veurink; Jeroen Van Westrenen, all of Amsterdam, Netherlands

[73] Assignee: Shell Oil Company, Houston, Tex.

[21] Appl. No.: 553,947

[22] Filed: Nov. 6, 1995

Related U.S. Application Data

[62] Division of Ser. No. 333,190, Nov. 2, 1994, abandoned.

[30] Foreign Application Priority Data

Nov. 18, 1993 [NL] Netherlands ............... 93203244.4

[51] Int. Cl.⁶ ............... C08F 297/04; C08L 53/02
[52] U.S. Cl. ............... 525/314; 525/89; 525/250; 525/271; 526/173; 526/174
[58] Field of Search ............... 525/314, 250, 525/271; 526/173, 174

[56] References Cited

U.S. PATENT DOCUMENTS

| | | | |
|---|---|---|---|
| 3,819,767 | 6/1974 | Shimomura et al. | 525/255 |
| 3,911,054 | 10/1975 | Roest et al. | 525/259 |
| 4,163,764 | 8/1979 | Nash | 524/151 |
| 4,260,694 | 4/1981 | Schwab | 525/314 |
| 5,171,800 | 12/1992 | Broustert | 525/250 |
| 5,405,903 | 4/1995 | Van Westrenen et al. | 525/89 |

FOREIGN PATENT DOCUMENTS

| | | |
|---|---|---|
| 0242612 | 3/1987 | European Pat. Off. . |
| 0242614 | 3/1987 | European Pat. Off. . |

OTHER PUBLICATIONS

Frank C. Jagisch and Jean M. Tancrede, New Styrene Block Copolymers for Tape and Label Use, pp. 8–24.
International Search Report dated Mar. 17, 1995.

*Primary Examiner*—Mark L. Warzel

[57] ABSTRACT

Block copolymer compositions, comprising for a major part of linear triblock copolymers, comprising two terminal predominantly poly(monovinylaromatic) blocks having a real molecular weight in the range of from 5,000 to 25,000 and one predominantly poly(boutadiene) midblock, said triblock copolymer having a monovinylaromafic content in the range of from 10 to 55 wt %, an apparent total molecular weight in the range of from 15,000 to 300,000, and an amount of from 0 to 40 wt % of a diblock copolymer relative to the total block copolymer composition weight, containing a predominantly poly(monovinylaromatic) block and a predominantly poly(boutadiene) block similar to those of the triblock copolymer component; said block copolymer composition having a free poly(vinylaromatic) content of at most 7 wt %, and shaped articles derived from said block copolymer composition.

5 Claims, No Drawings

BLOCK COPOLYMERS HAVING IMPROVED COMBINATIONS OF PROPERTIES

This is a division of application Ser. no. 08/333,190, filed Nov. 2, 1994, now abandoned.

FIELD OF THE INVENTION

The present invention relates to block copolymers having improved combinations of properties to processes for the preparation thereof and products derived therefrom. More in particular, the present invention relates to linear block copolymers having an improved combination of color stability, heat resistance, shear resistance during processing into the final articles, and abrasion resistance on the one hand, and tensile strength and/or hardness on the other hand.

BACKGROUND OF THE INVENTION

Styrene-conjugated diene block copolymers presently form a predominant key building block for a great variety of applications for which the occurrence of color stability, heat resistance, shear resistance, sufficient high abrasion resistance, tensile strength and/or hardness are still important requirements.

As was known from e.g. "New Styrene Block Copolymers for Tape and Label Use", F C Jagisch and J M Tancrede, PSCT Seminar Proceedings, May 1990, it has been generally accepted that in general styrene-conjugated diene block copolymers (further to be called SBC's) of the structures ABA or $(AB)_nX$ are prepared, wherein A represents a polystyrene block and B represents a poly (conjugated diene) and more preferably poly(butadiene), poly(isoprene), poly(butadiene/isoprene) or ethylene/butylene random copolymer. Three dominant commercial preparation methods for such SBC's have been developed:

(a) the traditional coupling method, involving the steps of synthesis of relatively low molecular weight poly (styrene) polymer blocks by monofunctional anionic initiation of styrene, addition of one or more conjugated dienes to form "living" poly(styrene-conjugated diene) segments or diblocks, and coupling these anionic living diblocks to yield linear styrene-conjugated diene-styrene copolymer or coupling with multifunctional coupling agents to yield multiarmed or radial copolymers, or (b) sequential synthesis of a linear triblock copolymer ABA by initial synthesis of a diene midblock using a difunctional initiator, wherein the chain is growing from the centre outward in both directions, addition of styrene which reacts with the dienyl anion chain ends to form polystyrene endblocks, and termination with a suitable proton donor, and (c) sequential synthesis of a linear triblock copolymer ABA by initial synthesis of a living polystyrene block through a monofunctional initiator, addition of conjugated diene and completing its polymerization, addition of a second portion of styrene and completing its polymerization, and termination with a suitable proton donor.

On the one hand, it will be appreciated that an inherent consequence of preparation method (a) is the presence of a varying amount, usually 15 percent or more, of uncoupled terminated diblock, since the coupling process does not provide 100 percent conversion, halogen containing residues originating from the coupling agents, and possible weak coupling sites, causing uncontrolled breakdown of block copolymers during processing. The diblock copolymer has appeared to have different effects in varying degrees on the final properties in the products to be produced from these block copolymers, such as dilution of the mechanical properties while the content of diblock copolymer in each batch of the desired triblock copolymer could difficultly be adjusted.

Moreover, such diblock components have appeared to cause a significant reduction of the melt viscosity and are for this reason desired to occur in a predetermined concentration in the finally produced block copolymer, by means of a method of "fine tuning" the molar fraction of diblock copolymer in the finally obtained triblock copolymer composition. As a consequence it will be appreciated that the presence of the diblock copolymers will negatively influence the mechanical properties of the triblock copolymer containing composition.

There is still a strong need for improved color stable, heat-resistant and shear-resistant SBC's, which also show attractive mechanical properties such as tensile strength and/or hardness and/or abrasion resistance in combination with attractive processability.

A great variety of proposals were made during the last decade to solve the problem of the color stability, heat stability and shear stability of SBC's, in general directed on the avoidance of the use of specific halogen-containing coupling agents, the use of specifically selected antioxidant additives to stabilize the poly(conjugated diene) phase during block copolymer processing stage and/or the use of specific selected acids to be used for the neutralization of the living terminal alkali metal salts and in particular lithium salts, resulting from the initiation.

However, the need for further improved mechanical properties such as tensile strength and/or hardness and/or abrasion resistance, in addition to said color stability, heat stability and shear stability still remained for certain modern applications, e.g. the high quality shoe manufacturing, elastomer modification of engineering thermoplasts in blends, elastomer bitumen modification or hot melt adhesives and sealants.

It is an object of the present invention to provide SBC's having the indicated balance of properties. It is a further object of the present invention to provide an economically attractive process for manufacturing such SBC's.

SUMMARY OF THE INVENTION

The present invention includes block copolymer compositions comprising (a) for a major part of linear triblock copolymers, comprising two terminal predominantly poly (monovinylaromatic) blocks one predominantly poly (butadiene) midblock, said triblock copolymer having a monovinylaromatic content in the range of from 10 to 55 wt % based on the total weight of block copolymer, and an apparent total molecular weight in the range of from 15,000 to 300,000, and (b) an amount of from 0 to 40 wt % of a diblock copolymer relative to the total block copolymer composition weight, the diblock copolymer containing a predominantly poly(monovinylaromatic) block and a predominantly poly(butadiene) block similar to those of the triblock copolymer component, wherein said block copolymer composition having a free poly(vinylaromatic) content of at most 7 wt %.

DETAILED DESCRIPTION OF THE INVENTION

As a result of extensive research and experimentation there have been surprisingly found SBC's, showing an improved combination of properties and a process for their efficient manufacture. Accordingly, the present invention includes block copolymer compositions comprising (a) for a major part of linear triblock copolymers, comprising two terminal predominantly poly(monovinylaromatic) blocks having a real molecular weight in the range of from 5,000 to 25,000 and one predominantly poly(butadiene) midblock, said triblock copolymer having a monovinylaromatic content in the range of from 10 to 55 wt % and preferably from 15 to 35 wt %, based on the total weight of block copolymer, an apparent total molecular weight in the range of from 15,000 to 300,000 and preferably from 100,000 to 270,000, and (b) an amount of from 0 to 40 wt %, preferably from 5 wt % to 40 wt %, of a diblock copolymer relative to the total block copolymer composition weight, containing a predominantly poly(monovinylaromatic) block and a predominantly poly(butadiene) block similar to those of the triblock copolymer component; wherein the block copolymer composition has a free poly(vinylaromatic) content of at most 7 wt %, and wherein the poly(vinylaromatic) endblocks in the block copolymer components have a molecular weight distribution $\overline{Mw}/\overline{Mn}<1.15$, and in addition a weight ratio between the poly(monovinylaromatic) endblocks of the triblock copolymer in the range of from 0.85 to 1.15.

It has also been found that in the case of preparation methods (b) and (c), the poly(styrene) blocks or the final poly(styrene) block respectively normally appeared to show an unattractively increased molecular weight distribution as compared to the poly(styrene) block first made via method (a) especially when dealing with poly(butadiene) midblocks. The molecular weight distribution is defined as the $\overline{Mw}/\overline{Mn}$ further denoted throughout this specification as P (=polydispersity factor) and was found to have to be in a specific range.

The term "predominantly poly(monovinylaromatic) blocks" and "predominantly poly(butadiene) blocks" as used throughout the present specification mean respectively substantially pure homopolymer blocks or copolymer blocks derived from one major monomer, i.e. at least 95 wt % and preferably more than 99 wt % and a minor amount of structurally related comonomers or a minor amount of the other comonomer(s) occurring in final block copolymers, in particular butadiene or any other conjugated diene as minor amount in predominantly styrene, may be present in said block copolymers.

The monovinylaromatic monomers may be selected from styrene, α-methylstyrene, o-methylstyrene, p-methylstyrene, p-tert.butylstyrene, 1,3-dimethylstyrene or mixtures thereof, of which styrene is the preferred major monomer.

More preferably pure homopolymer blocks of styrene are included in the block copolymer compositions of the present invention, but also copolymer blocks of e.g. styrene and minor amounts (<5 wt %) of one or more of the beforementioned monovinylaromatic or minor amount of other occurring comonomers, can be included.

The poly(butadiene) blocks may be pure homopolymer blocks or blocks consisting of butadiene and minor amounts of other structurally related conjugated diene monomers, such as isoprene; 2,3-dimethyl 1,3-butadiene; 1,3-pentadiene or 1,3-hexadiene or minor amounts of other comonomers occurring in the copolymer blocks and in particular one or more of the hereinbefore specified monovinylaromatic monomers and preferably styrene.

In particular the predominantly poly(butadiene) blocks of the triblock copolymer component according to the present invention, have real average molecular weights in the range of from 5,000 to 350,000, and preferably in the range of from 10,000 to 250,000 and more preferably in the range of from 20,000 to 200,000, whereas the predominantly (monovinylaromatic) blocks have average GPC molecular weights in the range of from 5,000 to 35,000 and preferably from 7,000 to 25,000 and more preferably from 10,000 to 20,000.

The vinyl contents of said poly(butadiene) blocks are normally not exceeding 15 wt % and must preferably be around 9 wt %.

With the term "diblock copolymers containing ... block, similar to those of the triblock copolymer", as used throughout the present specification, is meant diblock copolymers, the poly(monovinylaromatic) block of which is substantially identical to the last formed poly(monovinylaromatic) block of the triblock copolymer.

The term "substantially identical", as used in this connection, means that the molar weight ratio between the poly(monovinylaromatic) block of the diblock and the last formed poly(monovinylaromatic) block in the triblock copolymer, is within the range from 0.95 to 1.05, preferably from 0.99 to 1.01 and is more preferably as close to 1.00 as much as possible.

With the term "apparent molecular weight" as used throughout the specification, is meant the molecular weight of a polymer, as measured with Gel Permeation Chromatography (GPC) using several poly(styrene) calibration standards as described in ASTM D-3536.

With the term "real molecular weight", as used throughout the specification, is meant the molecular weight of an isolated poly(monovinylaromatic) block, measured by means of GPC, using several poly(styrene) calibration standards as described in ASTM D-3536.

The total average apparent molecular weights of said diblocks are in the range of from 50,000 to 250,000 and preferably from 70,000 to 225,000. More preferably the molecular weight of the diblock copolymer is about half the molecular weight of the triblock.

A more preferred diblock copolymer content in the block copolymer composition is in the range of from 15 to 30 wt %.

Most preferred block copolymer compositions are comprising triblock copolymer and diblock copolymers, containing pure poly(styrene) and pure poly(butadiene) blocks.

Preferably the monovinylaromatic content of the triblock copolymer is in the range of from 15 to 35 wt %.

The apparent total molecular weight of the triblock copolymer is preferably in the range of from 100,000 to 270,000.

The free poly(monovinylaromatic) content in the block copolymer composition is preferably less than 4 wt % and more preferably less than 1 wt %.

The weight ratio of the poly(monovinylaromatic) blocks of the triblock copolymer is preferably in the range of from 0.90 to 1.10, more preferably from 0.99 to 1.01 and most preferably as close as possible to 1.00.

The block copolymer compositions as specified hereinbefore have surprisingly been found to show improved tensile strength and/or hardness, while retaining their other properties such as abrasion resistance, color stability, heat stability and shear stability.

The block copolymer compositions of the present invention as specified hereinbefore, are obtainable by a process comprising the steps:

(1) polymerizing monovinylaromatic monomer and preferably styrene, optionally mixed with other comonomers in a minor amount, in an inert hydrocarbon solvent, in the presence of a monovalent organolithium initiator until substantially complete conversion of the monomer(s);

(2) adding 1,3-butadiene optionally mixed with other comonomers in a minor amount, and preferably substantially pure 1,3-butadiene, to the polymerization mixture and allowing said predominantly butadiene monomer to polymerize until substantially complete conversion;

(3) optionally adding a second portion of the monovalent organolithium initiator, followed by the addition of a second portion of predominantly butadiene, and allowing said monomer to polymerize until substantially complete conversion;

(4) adding a randomizing agent;

(5) adding a second portion of monovinylaromatic monomer and allowing said monomer to polymerize until substantially complete conversion;

(6) adding a proton donating terminating agent;

(7) recovery of the block copolymer composition; and (8) optionally mixing the pure triblock copolymer with a predetermined amount of a diblock copolymer and preferably a substantially identical diblock copolymer.

The block copolymer compositions of the present invention as specified hereinbefore are obtainable by an alternative process embodiment, comprising the steps:

(1) polymerizing 1,3-butadiene in an inert hydrocarbon solvent, in the presence of a divalent organolithium initiator, until substantially complete conversion of the monomer(s);

(2) adding a randomizing agent;

(3) adding a portion of the monovinylaromatic monomer and allowing said monomer to polymerize until substantially complete conversion;

(4) adding a proton donating terminating agent;

(5) recovery of the block copolymer composition; and (6) optionally mixing the obtained triblock copolymer with a predetermined amount of substantially identical diblock copolymer.

The described process embodiments form another aspect of the present invention. It will be appreciated that the block copolymer compositions obtained according to the hereinbefore specified process embodiments may comprise pure triblock copolymers and/or mixtures of said triblock copolymers and diblock copolymers, the latter component of which may be formed in situ by reinitiation or may be mixed later on in a predetermined amount with the triblock copolymer.

Preferably, the poly(monovinylaromatic) block of the diblock copolymer component is substantially identical to that of the last formed poly(monovinylaromatic) block of the triblock copolymer. Therefore, the diblock component in the composition will preferably be prepared in situ by reinitiation and appropriate adaptation of the monomer amounts.

A preferred monovalent organolithium initiator is sec-butyllithium, although also tert-butyllithium or n-butyllithium may be used with good results.

Suitable divalent organolithium initiators may be selected from 1,4-dilithio-1,1,4,4-tetraphenylbutane, 1,3-bis(1-lithio-1,3-dimethylpentyl)benzene, 1,3-bis(litho-3-methylpentyl)benzene, 1,3-phenylene bis(3-methyl-1-phenylpentylidene)bis(lithium), 1,3-phenylene bis(3-methyl-1-(4-methylphenyl)-pentylidene bis(lithium).

Preferred divalent initiators are 1,3-bis (1-lithio- 1,3-dimethylpentyl)benzene or 1,3-phenylene bis(3-methyl-1-phenylpentylidene)bis(lithium).

It will be appreciated that one or more stabilizing compounds and/or specifically selected acids for solubilization and extraction of lithium or other metal residues from organometal initiators, can be added to the initially obtained block copolymers.

Such compounds may be added after, during or even just before the termination of living polymers. However, the stabilizing agents will preferably be added just after termination.

According to a more preferred embodiment, to the block copolymer composition, as obtained after step (6) of the process using monovalent organolithium initiator or later on, may be added a predetermined amount of stabilizing agent or combinations of such agents without any additional acids. The stabilizing agents to be used are normally selected from the group comprising 2,6-di-tert.butyl-4-methylphenol (IONOL), octadecyl ester of 3,5-bis(1,1-dimethylethyl)-4-hydroxy benzene propanoic acid (IRGANOX 1076), 2,4-bis (n-octylthio)6-(4-hydroxy-3,5-di-tert-butyl anilino)-1,3, 5triazine (IRGANOX 565), 2-tert-butyl-6(3-tert-butyl-2-hydroxy-5-methylbenzyl)-4-methylphenyl acrylate (SUMILIZER GM) and combinations thereof; and/or a phosphite antioxidant, selected from tris-(nonylphenyl) phosphite (TNPP), (POLYGARD HR), tris(mixed mono- and di-nonylphenyl)phosphite, bis(2,4-di-tert.butylphenyl) pentaerithritol diphosphite, (ULTRANOX 626) and combinations thereof. (IONOL, IRGANOX, POLYGARD, ULTRANOX and SUMILIZER are trademarks.)

A preferred phosphite antioxidant is TNPP. Such stabilizers may be added in amounts of from 0.1 to 5 parts by weight per 100 parts by weight of block copolymer composition, and preferably from 0.2 to 1 part by weight per 100 parts by weight, whereas the mutual weight ratio of the phosphite stabilizer and the UV stabilizer is in the range of from 1 to 20 and preferably from 2 to 10.

It will be appreciated that the finally obtained block copolymer compositions will comprise triblock copolymers and diblock copolymers, the mutual weight ratio of which will be governed by the specific amounts of monomer(s) and second portion of monovalent organolithium initiator relative to the first portion of said initiator, to be supplied in steps 2 and 3.

With the term "randomizing agent" as used throughout the present specification, is meant any suitable agent which was used according to prior art polymerization processes for the manufacture of randomized copolymers of monovinylaromatic monomers and conjugated dienes and in particular of styrene and butadiene and/or isoprene mixtures.

Specific examples of radomizing agents are:

diethoxyethane, 1,2-diethoxypropane, ethyleneglycol dimethylether, ethyleneglycol di-n-butylether, diethyleneglycol dimethylether, ethyleneglycol diisopropylether, ethyleneglycol di-n-propylether, ethyleneglycol di-tert-butylether, ethyleneglycol n-butyl, tert-butylether, ethyleneglycol n-propyl tert-butylether, diethyleneglycol diisopropylether, dimethylether, diethylether, diisopropylether, di-n-butylether, diisobutylether, propyleneglycol dimethylether, propyleneglycol diethylether and propyleneglycol diisopropylether, orthodimethoxybenzene, tetrahydrofuran, tetrahydropyran or dioxane. Randomizing agents further include compounds of the formula:

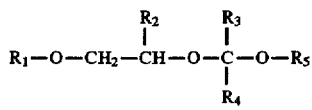

wherein $R_1$ is an alkyl group having 2–18 carbon atoms, $R_2$ and $R_3$ are hydrogen or an alkyl group having 1–4 carbon atoms, $R_4$ is hydrogen or an alkyl group having 1–6 carbon atoms and $R_5$ is an alkyl group having 1–18 carbon atoms, and wherein preferably $R_1$ is an alkyl group having 3–6 carbon atoms, $R_2$ and $R_3$ are hydrogen and $R_4$ and $R_5$ are alkyl groups having 1–4 carbon atoms, and most preferably $R_1$=n-butyl, $R_2$=$R_3$=hydrogen, $R_4$=methyl, $R_5$=isobutyl.

Of these randomizing agents diethoxyethane, dioxane, orthodimethoxybenzene, 1,2-diethoxypropane, diethyleneglycol dimethylether, diethyleneglycol diethylether, ethyleneglycol di-n-butylether, and ethyleneglycol di-n-propylether are preferred, while diethoxyethane or 1,2-diethoxypropane were found to be more preferred.

Examples of proton donating terminating agents are water, alcohols and particular lower alkanols, hydrogen, monoglycidylethers, of which alkanols such as methanol or hydrogen are preferred.

The solvent to be used for the preparation of the block copolymer(s), are preferably pure cyclohexane or pure cyclopentane, or mixtures of one of these solvents as main solvent with a minor amount (<50 wt %) of linear or branched alkanes having 5 to 7 carbon atoms such as n-hexane, isopentane or n-pentane.

Particularly suitable are cyclohexane, cyclohexane/n-hexane mixtures, cyclohexane/isopentane/n-hexane mixtures, cyclopentane or cyclopentane/isopentane mixtures.

Cyclohexane/isopentane mixtures, substantially pure cyclohexane or cyclopentane are preferred and cyclopentane is the most preferred.

It will be appreciated that the preparation of the triblock constituent, optionally mixed with a corresponding diblock copolymer, obtainable by reinitiation, can be carried out in one single reactor equipped with a recycling condenser or in a dual reactor system.

The drying of the block copolymer to remove the last amounts of adhering water can be carried out in a fluid bed dryer, a hot belt dryer or in a closed evaporator/dryer, wherein a rotating shaft provided with several heated self-cleaning arms, which move along fixed partition plates.

It is true, that the presence of ether compounds like tetrahydrofuran (THF) during polymerization of monovinylaromatic monomers was known from e.g. U.S. Pat. No. 4,163,764 and European patent applications Nos. 0242612 and 0242614.

In particular from e.g. the U.S. Pat. No. 4,163,764, column 2, it was known to include a small amount of a polar organic compound in homopolymerization of a monovinylarene such as styrene, to assist in initiation and polymerization of the monovinylarene. Such polar organic compound could be selected from hydrocarbyl ethers and tertiary amines and could be used in an amount in the range of from 0.001 to 10 and preferably 0.01 to 1 phm.

However, said U.S. Pat. No. 4,163,764 was actually teaching the preparation of initial diblock copolymers, which were subsequently coupled to linear or radial block copolymers, which should show increased tack and better creep resistance in adhesive compositions.

The European patent applications Nos. 0242612 and 0242614 disclosed the production of polymodal, craze-resistant, low color, transparent linear block copolymers with terminal resinous blocks, comprising a sequential charge polymerization process starting with a polymerization of a monovinylaromatic monomer.

During the polymerization of the first charge of monovinylaromatic monomer (S1), from 0.01 to 1.0 pts by weight of THF was present according to Table I in the main solvent (cyclohexane).

However, no teaching at all could be derived by a person skilled in the art from said publications to improve the mechanical properties and in particular the tensile strength and/or hardness of the sequentially prepared block copolymers, of which other physical properties were retained.

It will be appreciated that the block copolymer compositions of the present invention provide advantageous properties to blends to be used for footwear or modification of engineering thermoplasts or bitumen modification or hot melt adhesives or sealants.

Depending on the specific final application type, either pure sequentially prepared triblock copolymers or mixtures of said triblock copolymers and similar diblock copolymers can be prepared.

Moreover said block copolymer compositions can be supplied as tailor-made, high standardized quality compositions due to the applied manufacturing process, which enables an adjustable, predetermined molar ratio between the triblock and diblock copolymer component if reinitiation is applied.

It will be appreciated that another aspect of the present invention is formed by intermediate compositions, ready for processing into footwear articles, hot melt adhesives, bitumen compositions and modified engineering thermoplast blends, and containing in addition to the block copolymer compositions one or more auxiliaries, such as extender oil fibers, coloring agents and the like. Moreover, another aspect of the invention is formed by footwear articles or shaped modified engineering thermoplasts obtained therefrom.

DESCRIPTION OF PREFERRED EMBODIMENTS

The invention is further illustrated by the following examples, without restricting the scope of the invention to these specific embodiments.

In these examples the molecular weight of the respective block copolymer components prepared, is determined by Gel Permeation Chromatography (GPC) using polystyrene calibration standards as described in ASTM D-3536. The polystyrene content of the block copolymers is determined according to the method specified in ASTM D-3314.

From the data obtained by these methods other data such as the molecular weight ratio of the respective polybutadiene blocks in the triblock and diblock copolymers and poly (styrene) weight ratio in the triblock and diblock copolymers are derived. $\overline{Mw}/\overline{Mn}$=P (polydispersity factor) of the poly (monovinylaromatic) blocks can be determined according to ASTM D-3536.

Example I

A block copolymer composition comprising a styrene-butadiene-styrene triblock copolymer (S-B-B'-S') and a styrene-butadiene diblock copolymer (S'B') was produced by a reinitiation process, wherein a) both block copolymers had a target styrene content of 30 wt %, and b) the target weight ratio triblock/diblock was 85/15.

The composition was prepared as follows: 255 g styrene was added to 23 liters cyclohexane at 60° C., after which 23.2 mmol sec-butyllithium (s-BuLi) was added. The polymerization was completed after 20 minutes. The temperature of the reaction mixture was raised to 70° C. and 595 g butadiene was added. The polymerization was allowed to proceed for 30 minutes. A second portion of s-BuLi (8.2 retool) was added, followed by 805 g butadiene. The polymerization was allowed to proceed for 40 minutes (99.9% conversion). Hereafter, 3.0 g diethoxypropane (DEP) is added, followed by a final portion of styrene of 345 g styrene and the polymerization was allowed to proceed for 10 minutes. Then 47 Mmol of ethanol was added as a terminating agent to quench the styrenyl anion.

After the addition of 12 g Ionol dissolved in 120 g cyclohexane, the product was isolated by steam stripping to give white crumbs.

Example II

A block copolymer composition was prepared according to the same proceedings of example I, except that DEP is replaced by 3.0 g diethoxyethane.

Comparative Example I

A block copolymer composition was prepared according to the same proceedings of example I, without the addition of DEP.

Comparative Example II

A block copolymer composition was prepared as follows: 600 g of styrene was added to 23 liters cyclohexane at 60° C., after which 54.55 mmol sec-butyllithium was added. The polymerization was complete after 15 minutes. The temperature of the reaction mixture was raised to 70° C. and 1400 g butadiene was added. The polymerization was allowed to proceed for 30 minutes. Hereafter 5.1 g dibromoethane is added. The coupling reaction was complete after 30 minutes. The polymer is stabilized and isolated as described in example I.

TABLE I

|  | Ex. I | Ex. II | Comp. I | Comp. II |
| --- | --- | --- | --- | --- |
| MFR (200° C./5 kg) | 6.2 | 6.2 | 6.2 | 6.1 |
| Tensile strength, MPa | 23.3 | 23.6 | 18.5 | 24.2 |
| Modulus, 300%, MPa | 3.7 | 3.7 | 3.7 | 3.7 |
| Elongation at break, % | 900 | 900 | 1000 | 800 |
| Hardness, ShA | 66 | 67 | 62 | 68 |
| DIN abrasion, mm3 | 52 | 52 | 51 | 84 |
| Color after Brabender treatment | white | white | white | yellow |

TABLE II

|  | SB MW (app) | (SB)2 MW(app) | B'S' MW(app) | SBB'S' MW(app) | CE1 (%) | P (Mw/Mn) |
| --- | --- | --- | --- | --- | --- | --- |
| Ex. I |  |  | 60.6 | 120 | 86 | 1.1 |
| Ex. II |  |  | 61.3 | 120 | 85 | 1.1 |
| Comp. I |  |  | 62.5 | 119 | 85 | 1.20 |
| Comp. II | 63.0 | 122 |  |  |  | 1.05 |

1 CE: coupling efficiency.

MW(app).: Apparent molecular weights as determined by GPC, according to ASTM D-3536.

Coupling efficiency is defined by the weight ratio of triblock (SBB'S') to total weight triblock (SBB'S') plus diblock (B'S'). In case of the use of a coupling agent this definition becomes the weight ratio of the coupled polymer to the weight of the SB diblock present prior to coupling.

P is the polydispersity factor determined for the total amount of poly(styrene) blocks, i.e. the first poly(styrene) plus final poly(styrene) block. This is determined for examples I and II and comparative examples I and II by applying ASTM D-3314-92, whereby the polystyrene blocks after treatment with osmium tetroxide are isolated and, subsequently, analyzed by GPC as described in ASTM D-3536.

We claim:

1. A process for the preparation of block copolymer compositions, comprising the steps of:

polymerizing 1,3-butadiene in an inert hydrocarbon solvent, in the presence of a divalent initiator selected from 1,3-bis(1-lithio-1,1,3-di-methylpentyl)benzene or 1,3-phenylene-bis(3-methyl-1-phenylpentylidene) bis (lithium), until substantially complete conversion of the butadiene;

adding a randomizing agent;

adding a portion of a monovinylaromatic monomer and allowing said monomer to polymerize until substantially complete conversion;

adding a proton donating terminating agent;

recovering the block copolymer composition wherein said block copolymer is a triblock copolymer; and optionally mixing the obtained triblock copolymer with a predetermined amount of diblock copolymer having a poly(monovinylaromatic block substantially identical to a last formed poly(monovinylaromatic) block of said triblock copolymer, wherein a molecular weight ratio between said diblock poly(monovinylaromatic block and said triblock poly(monovinylaromatic block is in a range from 0.95 to 1.05.

2. The process according to claim 1, characterized in that as randomizing agent diethoxyethane, dioxane orthodimethoxybenzene, 1,2-diethoxypropane, diethyleneglycol, dimethylether, diethyleneglycol diethylether, or ethyleneglycol di-n-butylether is used.

3. The process according to claim 2, characterized in that as randomizing agent ethyleneglycol di-n-propylether or diethoxyethane is used.

4. The process according to claim 1, characterized by using cyclohexane, cyclohexane/n-hexane mixtures, cyclohexane/isopentane/n-hexane mixtures, cyclopentane or cyclopentane/isopentane mixtures as the inert solvent.

5. The process according to claim 4, characterized by using pure cyclopentane as the inert solvent.

* * * * *